Nov. 25, 1924.
A. JOBE
POULTRY PERCH
Filed April 8, 1924
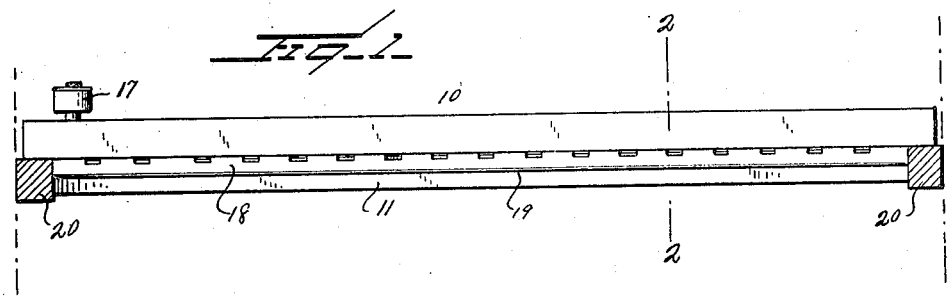
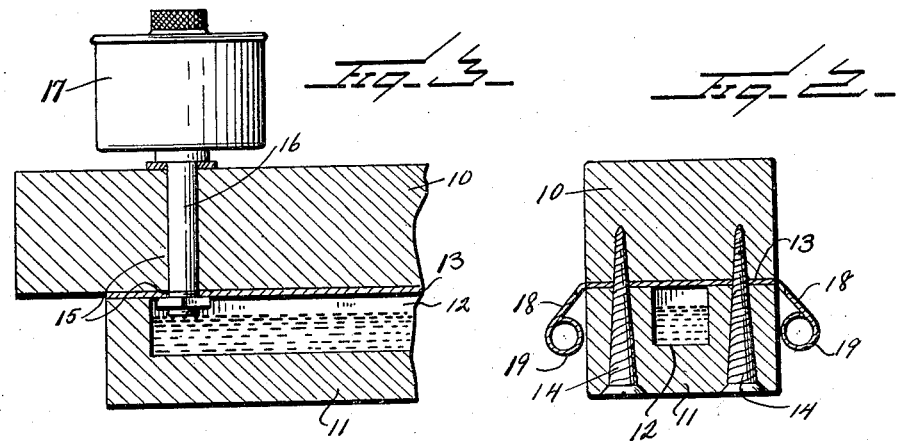
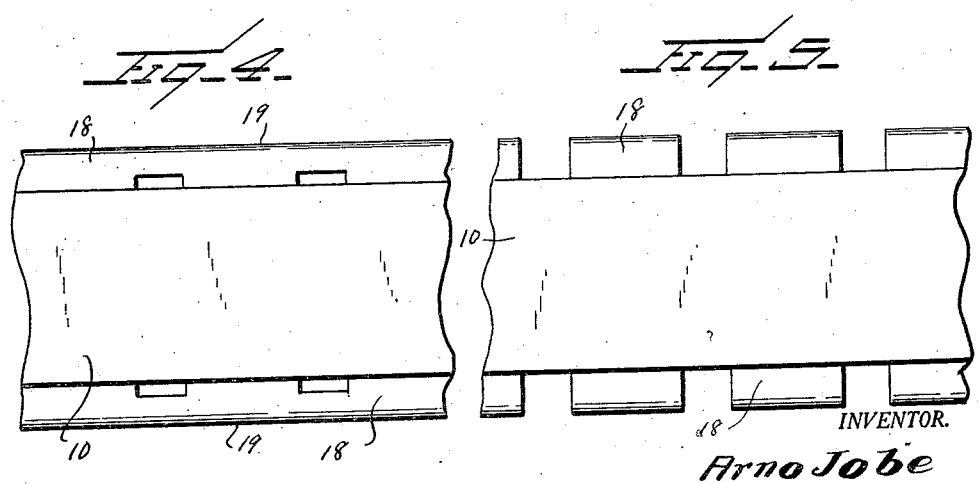
INVENTOR.
Arno Jobe
BY Watson E. Coleman
ATTORNEY.

Patented Nov. 25, 1924.

1,516,639

UNITED STATES PATENT OFFICE.

ARNO JOBE, OF NEW RICHLAND, MINNESOTA.

POULTRY PERCH.

Application filed April 8, 1924. Serial No. 705,007.

*To all whom it may concern:*

Be it known that I, ARNO JOBE, a citizen of the United States, residing at New Richland, in the county of Waseca and State of Minnesota, have invented certain new and useful Improvements in Poultry Perches, of which the following is a specification, reference being had to the accompanying drawings.

This invention relates to certain new and useful improvements in poultry perches and has for an important object thereof the provision of a vermin proof perch.

A further object of the invention is to provide a device of this character having means for applying to the under surface and lower portions of the sides of the perch an insecticide for destroying vermin, the perch being so constructed that this insecticide is not transmitted to the section of the perch upon which the fowl is actually resting.

A further object of the invention is to provide in a perch of this character a separator preventing the spread of the insecticide to the upper portion of the perch, so constructed that it not only prevents the spread of the insecticide as suggested, but likewise prevents the feet or feathers of the fowl from coming into contact with the insecticide coated portions of the perch. It is well known that oil which generally forms the base for such insecticide if applied to the outer surface of an egg soon finds its way through the shell and taints the contents, rendering the same unfit for use as food. Fowls resting upon a perch wet with insecticide collect this insecticide on their feathers with the result that it is transmitted to the eggs while they are on the nest. This is prevented by the structure hereinafter set forth.

A still further object of the invention is to provide a device of this character which may be readily and cheaply produced and which will be durable and efficient in service.

These and other objects I attain by the construction shown in the accompanying drawings, wherein for the purpose of illustration is shown a preferred embodiment of my invention and wherein:—

Figure 1 is a side elevation of a poultry perch constructed in accordance with my invention;

Figure 2 is a transverse section on the line 2—2 of Figure 1;

Figure 3 is a detailed sectional view through one end of the perch showing the mounting of the insecticide reservoir;

Figures 4 and 5 are fragmentary plan views of the perch showing different methods of constructing the guard.

Referring now more particularly to the drawings, the numeral 10 indicates the main bar preferably formed of wood in the shape and size desired for use as a fowl perch. Disposed beneath the upper section 10 is a lower or container section 11 which is trough-shape having a slot or rabbet 12 formed therein adapted for the reception of an insecticide. This section 11 is preferably formed of soft permeable wood and is separated from the section 10 by a metallic strip 13. The sections 10 and 11 are secured together in any desired manner, in the present instance by securing elements 14 shown as screws extending upwardly through the lower section 11 and into the section 10. These securing elements should be of such character that they clamp the sections firmly together upon the plate 13 so as to provide a fluid tight joint. In the construction of the device aligned openings are provided through the plate 13 and upper section 10, as indicated at 15, for the reception of a conduit 16 leading from a filling can 17 disposed upon the upper surface of the section 10 of the perch. The sides of the plate 13 are provided with outwardly and downwardly inclining flanges 18, the edges of which are rolled, as indicated at 19. Through this flange openings are formed permitting the passage of mites from the fowl to the under surface of the perch. These openings may be either constructed as indicated in Figure 1 or may be formed by notching the flange 18 at intervals, as indicated in Figure 5.

It is well known to those familiar with the art that the red mite which is the principal source of annoyance to chickens is not a body inhabiting insect but makes its home upon the perches, mess and the like within the chicken house, coming forth at night when the chickens are on the roost to prey upon the chickens. These mites prefer some darkened place to conceal themselves and accordingly collect upon the bottom of the roost in great numbers. In the use of my invention an insecticide such as kerosene or any of the oily insect compounds employed against the mites is introduced through the filling can 17 to the trough 12 of the bottom section 11. The wood of the bottom section being readily permeable it soaks therethrough and this bottom section will accordingly have upon its surface at all times a sufficient quantity of the fluid to prevent the collection of or to destroy any collected mites. At the same time the plate 13 will prevent the transmission of the oily substance to the perch section proper formed by the upper section 10. This feature is particularly desirable, it being well known that the majority of these insecticides are, if not injurious to the feet of fowls, uncomfortable when they come in contact with the feet rendering the fowl restless. In the construction of the perch, the section 10 is preferably made slightly longer than the section 11, so that it may be secured to the usual supports 20 for the roost. It is also well known that a fowl, in perching upon a roost, employs the feet to grip the roost so that the toes extend downwardly upon the sides of the roost in engagement with it. Furthermore, a fowl resting upon the roost has its feathers engaged against the sides of the roost and extending downwardly along the roost. It will be obvious that without the provision of the flanges 18 above referred to, these feathers will come into contact with the oil soaked surface of the lower section 11 with the result that the feet would be injured as above set forth and the oil will be carried away by the fowl upon the under feathers which would be transmitted to eggs in a nest which the fowl subsequently entered. At the same time, these flanges, due to the openings provided therein, will not tend to prevent the passage of mites from the body of the fowls to the under surface of the perch. In the formation of the roll 19 upon the flanges 18, this is preferably formed upon the under surface of the flange so that oil which would tend to pass downwardly upon the inclined under surface of this plate will collect in this roll and kill any insects which might seek refuge therein.

It will be obvious from the foregoing that a perch constructed in accordance with my invention will effectually prevent collection of vermin upon the under surface thereof and at the same time will prevent contact of the insecticide with the feet of the fowl. It will likewise be obvious that the construction hereinbefore set forth is capable of some change and modification without materially departing from the spirit of my invention and I accordingly do not limit myself to such specific structure except as hereinafter claimed.

I claim—

1. In combination with a fowl perch, a metallic plate abutting the under surface of the perch, a trough member abutting the under surface of the plate, securing elements extending through the perch, plate and trough member and maintaining between the plate and trough member a fluid tight joint, and means for introducing an insecticide to the trough member, said trough member being entirely formed of soft material permeable by the insecticide said plate being impermeable to oil.

2. In combination with a fowl perch, a metallic plate abutting the under surface of the perch, a trough member abutting the under surface of the plate, securing elements extending through the perch, plate and trough member and maintaining between the plate and trough member a fluid tight joint, and means for introducing an insecticide to the trough member, said trough member being formed of soft material permeable by the insecticide, said plate being provided upon the sides thereof with flanges inclining outwardly and downwardly from the roost.

3. In combination with a fowl perch, a metallic plate abutting the under surface of the perch, a trough member abutting the under surface of the plate, securing elements extending through the perch, plate and trough member and maintaining between the plate and trough member a fluid tight joint, and means for introducing an insecticide to the trough member, said trough member being formed of soft material permeable by the insecticide, said plate being provided upon the sides thereof with flanges inclining outwardly and downwardly from the roost, said flanges being provided adjacent the perch with openings.

In testimony whereof I hereunto affix my signature.

ARNO JOBE.